June 29, 1965 R. S. OLIVER 3,191,579
BIRD FEEDER
Filed Jan. 27, 1964
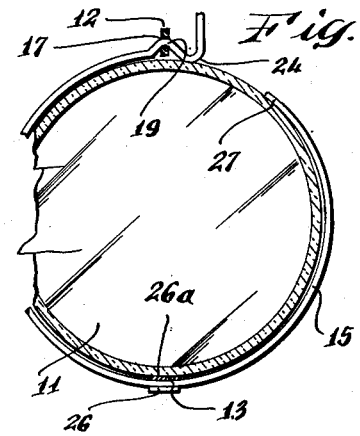
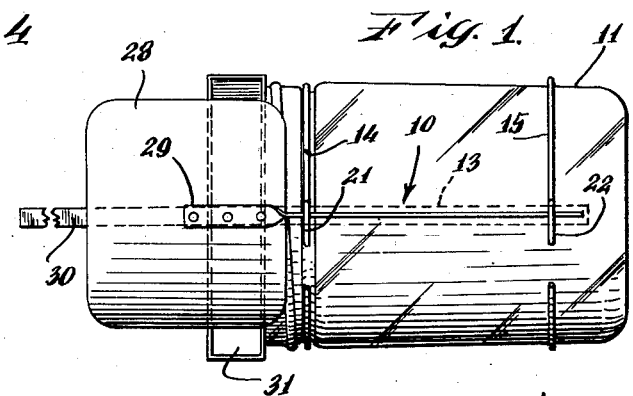
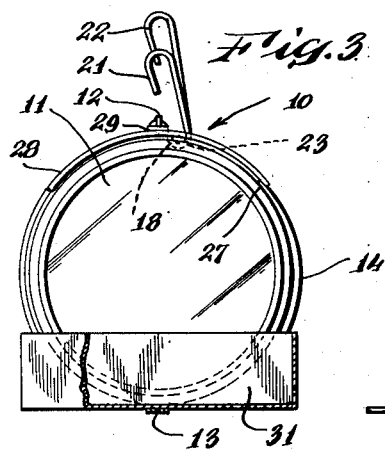
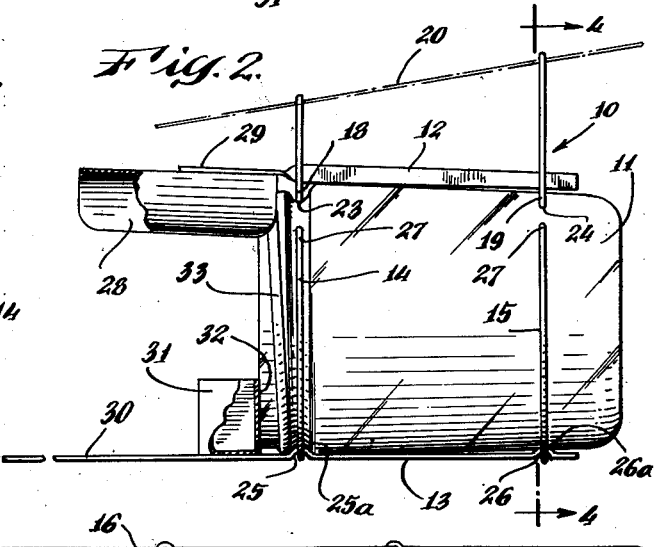
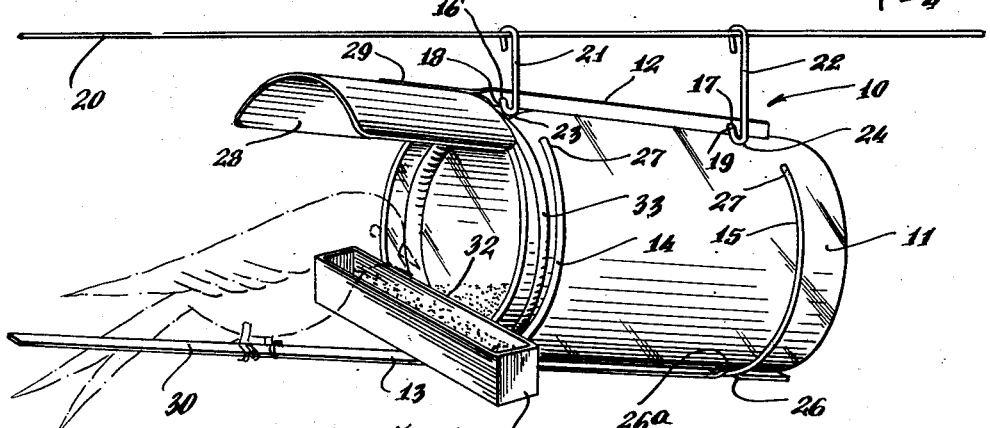
INVENTOR.
Robert S. Oliver
BY
Roy L. Passell
ATTORNEY.

United States Patent Office 3,191,579
Patented June 29, 1965

3,191,579
BIRD FEEDER
Robert S. Oliver, 95 Rogers Road, Hamden, Conn.
Filed Jan. 27, 1964, Ser. No. 340,140
5 Claims. (Cl. 119—51)

This invention relates to a bird feeder and in particular to a collapsible mount for the food container.

The present and future increase in urban areas with corresponding desecration of natural resources affording protection for wild life has developed the need for wild bird feeding and it is therefore one of the objects of this invention to provide a simple means for feeding wild birds.

It is a further object to provide a feeder which can be easily adapted from a common commercial container such as a glass jar or a tin can in which food is marketed.

Another object is to provide a feeder mount which can be collapsed or easily disassembled for mailing or storage.

And yet another object is to provide a simple inexpensive device which is easily procured, assembled and collapsed for storage when not in use, which can be used to encourage the feeding of wild birds.

Other objects and a fuller understanding of the invention may be had by referring to the following description and claims, taken in consideration with the accompanying drawings, in which:

FIGURE 1 is a view looking down on the top of my invention with a transparent feed container in place in the mounting;

FIGURE 2 is a side elevation of the feeder shown in FIGURE 1;

FIGURE 3 is an end view of the invention shown in FIGURE 2;

FIGURE 4 is a sectional view taken on the line 4—4 of FIGURE 2; and

FIGURE 5 is a perspective view of my invention attached to an aerial line.

Referring to the drawing numeral 10 denotes the frame or mounting for holding the feed container 11 and attaching it to an aerial line 20. The mounting 10 consists of a longitudinal top member 12 of any suitable material such as metal or plastic and a longitudinal bottom member 13 of similar material connected by a first or front transverse member 14 and a second or rear transverse member 15. Both of the transverse members 14 and 15 are preferably formed from wire having substantial spring properties so that they may exert a strong clamping or clinging action about the feed container 11 as will be subsequently described in more detail. These transverse members 14 and 15 are preformed in arcuate shape to enclose the feed container 11 at one end portion of each member and into loops 21 and 22 respectively for attaching to aerial line 20 at the other end. Loop 21 is preferably shorter than loop 22 to pitch the feed container backwardly as clearly shown in FIGURES 2 and 5.

Notches 18 and 19 are also formed in transverse members 14 and 15 respectively as clearly shown in FIGURES 3 and 4 to retain them in apertures 16 and 17 respectively in longitudinal member 13.

The bottoms 23 and 24 of suspension loops 21 and 22 are deeper than the main body of the transverse members 14 and 15 and the bottom edge of top member 12 so as to receive and wholly concentrate the bearing on the outer surface of feed container 11 as clearly shown in FIGURES 3 and 4.

Notches 25 and 26 in bottom member 13 retain transverse members 14 and 15 respectively against longitudinal movement and also provide concentrated bearing points 25a and 26a against the outside surface of container 11.

The arcuate portion of transverse members 14 and 15 surrounding the container 11 are of spring material which is given an inward set so that there is a strong tendency to close in on the container 11 and the end portion of each transverse member 14 and 15 is given an additional inward set so that it engages the outside surface of container 11 in a concentrated bearing point 27.

Thus the gripping pressure is concentrated in three bearing points, viz. 23, 24, 25a, 26a, and 27 of the respective transverse members about the circumference thereof which grip the container 11 against undesired movement which would not be the case if the gripping force was distributed over a greater outside area of the container 11.

A shield 28 is mounted on a forward extension 29 of top member 12. Bottom member 13 is extended forwardly to form a perch 30 and to support a trough 31. While container preferably is provided with a groove or thread 33 to anchor transverse member 14 against longitudinal movement, the inner side wall 32 of trough 31 may also act in this capacity by means of engaging the end of the container 11.

Sufficient latitude may be provided in the arcuate transverse members 14 and 15 to compensate for a wide range of containers of various diameters and tapers and with or without threads or grooves.

Although the invention has been described in its preferred form with a certain degree of particularity, it is understood that the present disclosure of the preferred form has been made only by way of example and that numerous changes in the details of construction and arrangement of parts may be resorted to without departing from the spirit and scope of the invention as hereinafter claimed.

I claim as my invention:

1. In an aerial bird feeder having a generally cylindrical food container provided with an open end, the improvement in mounting means, said improvement comprising a collapsible food container holding frame comprising a first resilient arcuate transverse member; a second resilient arcuate transverse member; a pair of spaced longitudinal members detachably connecting said first and second transverse members and respectively maintaining said transverse members in longitudinal spaced relationship; each of said transverse members having a free end inwardly biased to engage a food container when placed within said frame; and a pair of spaced supporting members to connect said frame to an aerial support.

2. In the device of claim 1 said frame having three circumferentially spaced bearing points in a transverse plane to engage such a container to radially concentrate said biasing at said three points to retain such container against unintended movement relative to said frame.

3. In an aerial bird feeder having a generally cylindrical food container provided with an open end, the improvement in mounting means, said improvement comprising a collapsible frame comprising a longitudinal top member having a pair of longitudinally spaced transversely directed apertures; a longitudinal bottom member having a pair of longitudinally spaced transverse notches correspondingly opposite said apertures respectively, resilient arcuate transverse members received in said apertures and said notches respectively connecting said top and bottom longitudinal members and having a portion thereof biased radially inward to engage a food container and hold same against undesired movement relative to said frame and a pair of upwardly extending link members to connect said feeder to an aerial supporting member.

4. In the device of claim 3 one of said transverse members having one inwardly formed end to engage such a food container and the other end formed into a link to connect with an aerial supporting member.

5. In the device of claim 4 one of said notches formed radially inward to engage such food container and a portion of each said transverse members adjacent said top longitudinal member formed radially inward to engage such food container whereby such container is supported at spaced points under the inwardly biasing of said transverse members.

References Cited by the Examiner

UNITED STATES PATENTS 3,049,093   8/62   Oliver _____ 119—51

SAMUEL KOREN, Primary Examiner.

HUGH R. CHAMBLEE, Examiner.